US012792102B2

(12) United States Patent
Koyama

(10) Patent No.: US 12,792,102 B2
(45) Date of Patent: Nov. 10, 2026

(54) LOCK MECHANISM INCLUDING A LOCK PORTION AND A FIXING PORTION

(71) Applicant: Panasonic Intellectual Property Management Co., Ltd., Osaka (JP)

(72) Inventor: Tatsuya Koyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 331 days.

(21) Appl. No.: 18/441,321

(22) Filed: Feb. 14, 2024

(65) Prior Publication Data

US 2024/0272684 A1 Aug. 15, 2024

Related U.S. Application Data

(60) Provisional application No. 63/445,358, filed on Feb. 14, 2023.

(51) Int. Cl.
*G06F 1/16* (2006.01)

(52) U.S. Cl.
CPC .................................. *G06F 1/1679* (2013.01)

(58) Field of Classification Search
CPC ..................................................... G06F 1/1769
See application file for complete search history.

(56) References Cited

U.S. PATENT DOCUMENTS 5,876,244 A * 3/1999 Tabata ............... H01R 13/6272 439/352
6,315,594 B1 11/2001 Yanagida
9,859,653 B2 1/2018 Motohashi et al.
2016/0036143 A1 2/2016 Motohashi et al.

FOREIGN PATENT DOCUMENTS

EP 1 372 224 12/2003
JP 11-97108 4/1999
JP 2004-95420 3/2004
JP 2016-35802 3/2016

OTHER PUBLICATIONS

Extended European Search Report issued Jul. 12, 2024 in corresponding European Patent Application No. 24157532.3.

* cited by examiner

*Primary Examiner* — Phuong K Dinh
(74) *Attorney, Agent, or Firm* — Wenderoth, Lind & Ponack, L.L.P.

(57) ABSTRACT

A lock mechanism fixes connection between a first and second housings provided in an electronic device. The lock mechanism includes a lock portion provided in one of the first and second housings, and a fixing portion provided in the other thereof and fixing the lock portion by latching the lock portion in a first direction intersecting with a connection direction of the first and second housings. The lock portion includes an attachment portion attaching the lock portion to the one of the first and second housings, and a lock claw portion. When the first and second housings are connected, the lock claw portion is provided in the same direction as the attachment portion and at a position close to the fixing portion as viewed from the fixing portion in the connection direction, and is provided closer to the fixing portion than the attachment portion in the first direction.

13 Claims, 16 Drawing Sheets

LOCK MECHANISM INCLUDING A LOCK PORTION AND A FIXING PORTION

1. FIELD OF THE INVENTION

The present disclosure relates to a lock mechanism.

2. BACKGROUND OF THE ART

JPH11-97108A discloses a lock structure of a connector in which an engaging projection is provided on a side surface of a connector housing of one of a male connector and a female connector to be fitted and connected, an engaging claw is provided on a tip portion of a lock arm having an elastically deformable cantilever structure provided on a top portion of the other connector housing in manner of corresponding to the engaging projection, and the engaging claw is detachably engaged with the engaging projection. A side portion of the lock arm is provided with a tapered protruding portion that is gradually inclined inward from a base side of the lock arm toward a tip side thereof, and the tip side of the lock arm is elastically deformed outward via the tapered protruding portion by a flat jig inserted between the top portion of the connector housing and the tapered protruding portion from the base side of the lock arm, and the engaging claw is disengaged from the engaging projection to release the lock.

JP2004-95420A discloses a connector lock structure in which a lock portion on an outer surface of a connector is locked and fixed to a locked portion provided on a fixing object. The connector includes an inverted L-shaped lock portion protruding from a main body thereof, and an engaging claw provided at a lower end of the lock portion, and the locked portion includes an engaging wall that is continuous with an outer surface of the fixing object and parallel to the outer surface with a space therebetween, and upper and lower openings that communicate with the space. At a center position on an inner surface side of the engaging wall, a thin wall portion is recessed downward from the vicinity of an upper end so that a step at an upper end of the thin wall portion serves as an engaged claw, and a notch is cut out from a lower end of the thin wall portion to a lower end of the engaging wall. The connector is locked and fixed to the locked portion by inserting the lock portion of the connector from the upper opening of the locked portion and causing the engaging claw to engage with the engaged claw, and when a jig that releases the engaging is inserted from the lower opening of the locked portion and the engaging between the engaging claw of the lock portion and the engaged claw of the locked portion is released, the jig is located in the notch to prevent interference between the jig and the thin wall portion.

SUMMARY OF THE INVENTION

An object of the present disclosure is to provide a lock mechanism that can withstand a vibration of an aircraft and a load generated when a passenger performs pulling-out and that can release a lock in a short time using a general-purpose tool.

The lock mechanism of the present disclosure fixes connection between a first housing and a second housing in an electronic device including the first housing and the second housing. The lock mechanism includes a lock portion provided in one of the first housing and the second housing; and a fixing portion provided in the other of the first housing and the second housing, and configured to fix the lock portion by latching the lock portion in a direction intersecting with a connection direction of the first housing and the second housing. The lock portion includes an attachment portion that attaches the lock portion to the one of the first housing and the second housing, and a lock claw portion latched to the fixing portion. When the first housing and the second housing are connected, the lock claw portion is provided in the same direction as the attachment portion and at a position close to the fixing portion as viewed from the fixing portion in the connection direction, and is provided closer to the fixing portion than the attachment portion in the direction intersecting with the connection direction.

According to the lock mechanism of the present disclosure, it is possible to withstand a vibration of an aircraft and a load generated when a passenger performs pulling-out, and to release a lock in a short time using a general-purpose tool.

DETAILED DESCRIPTION OF THE EXEMPLARY EMBODIMENT

Figure 1:
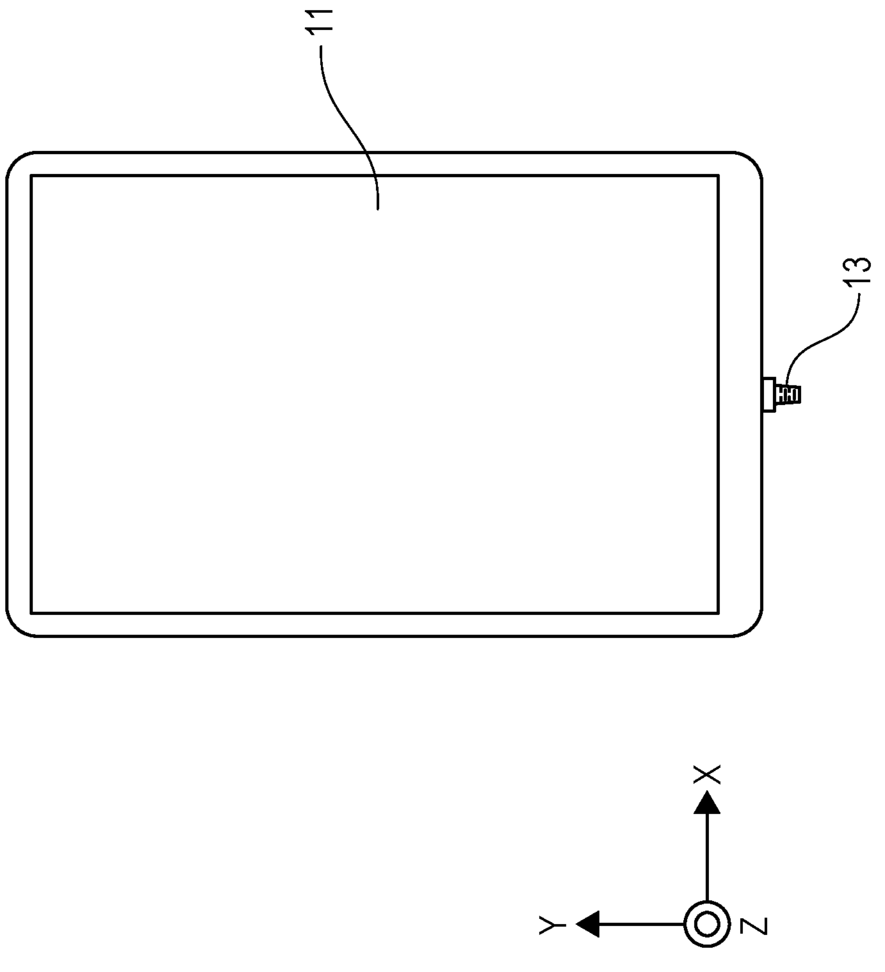
FIG. 1 is a front view of a device body according to a first embodiment.

Hereinafter, embodiments specifically disclosing an adaptor mechanism according to the present disclosure will be described in detail with reference to the drawings as appropriate. However, unnecessarily detailed descriptions may be omitted. For example, the detailed description of well-known matters and the redundant description of substantially the same configuration may be omitted. This is to avoid unnecessary redundancy of the following description and to facilitate understanding of a person skilled in the art. It should be noted that the accompanying drawings and the following description are provided for a person skilled in the art to fully understand the present disclosure, and are not intended to limit the subject matter described in the claims [Circumstances Leading to Obtaining an Embodiment According to the Present Disclosure]

In a moving body such as an aircraft, various electronic devices are provided so that a passenger views an in-flight entertainment system or the like. Some of these electronic devices are connected to a cable via an adaptor to provide power and prevent a theft performed by a passenger.

The adaptor for such electronic devices is sometimes pulled out and used by the passenger or exposed to a vibration from the aircraft, which creates a load on a connecting portion of the adaptor. Therefore, the adaptor of the electronic device is required to be provided with a lock mechanism capable of withstanding such a load.

It is also conceivable to increase holding force against pull-out force applied to the adaptor by employing a screwing structure. A lock mechanism with a screw takes, for example, 10 seconds to remove the screw and 10 seconds to attach the screw, and there is also a risk of a screw loss. On the other hand, there is a lock mechanism in the related art that aims to simplify adaptor separation work during maintenance work or the like. However, this lock mechanism requires a use of a dedicated tool that removes the adaptor Therefore, it is necessary for a mechanic to carry the dedicated tool into the aircraft or to perform special management in which the dedicated tool is always provided in the aircraft.

[Configuration, Etc.]

Hereinafter, a lock mechanism that can withstand the vibration of the aircraft and a load generated when a passenger performs pulling-out and that can release a lock in a short time using a general-purpose tool will be described.

First Embodiment

In a first embodiment, regarding an adaptor, which is a connecting portion between a wire and a device body in the electronic device for an aircraft which is connected to the wire for the purpose of a power supply and data communication, an example of the lock mechanism of the adaptor that can be easily removed using the general-purpose tool will be described. In the present specification, the adaptor is also collectively referred to as a first housing. Further, the device body is also collectively referred to as a second housing. Conversely, the adaptor may be collectively referred to as the second housing, and the device body may be collectively referred to as the first housing.

FIG. 1 is a front view of a device body 11 according to the first embodiment. In the present specification, it is assumed that X, Y, and Z directions follow directions of the arrows shown in the figure. The X, Y, and Z directions are orthogonal to one another, the X direction indicates a width direction of the device body 11, the Y direction indicates a length direction of the device body 11, and the Z direction indicates a thickness direction of the device body 11. Further, a double circle at a position where the arrows orthogonal to each other intersect with each other indicates a front view of the arrow, and a circled x indicates a rear view of the arrow.

The electronic device may be a tablet terminal that provides a passenger with information such as a video, or a remote controller for operating a display such as a monitor, and by connecting these device bodies 11 to a aircraft side, that is, to an upstream device via the wire 13, the electronic devices receive power and communicate information.

Figure 2:
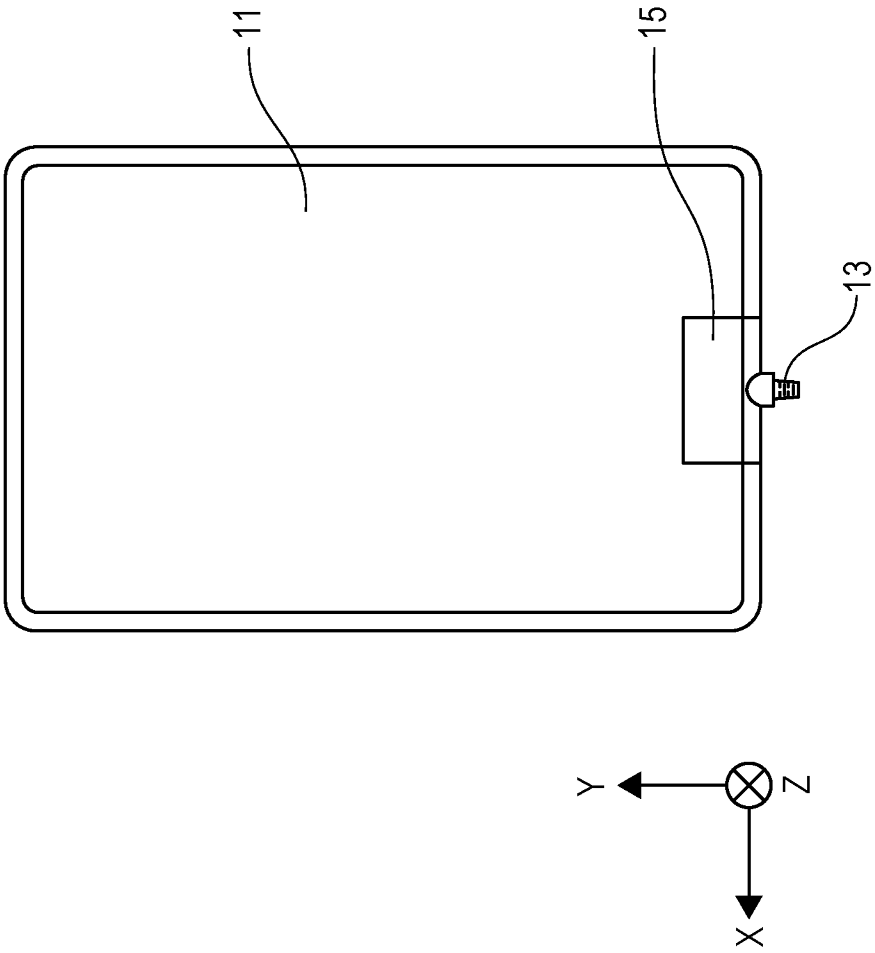
FIG. 2 is a rear view of an electronic device.

FIG. 2 is a rear view of the electronic device. The device body 11 includes a rectangular parallelepiped housing having four sides. An adaptor 15 is connected to one of the four sides. The wire 13 connected to the upstream device is connected to the adaptor 15. A position of the adaptor 15 may be any of the four sides of the device body 11, and is not limited to a position shown in FIG. 2.

Figure 3:
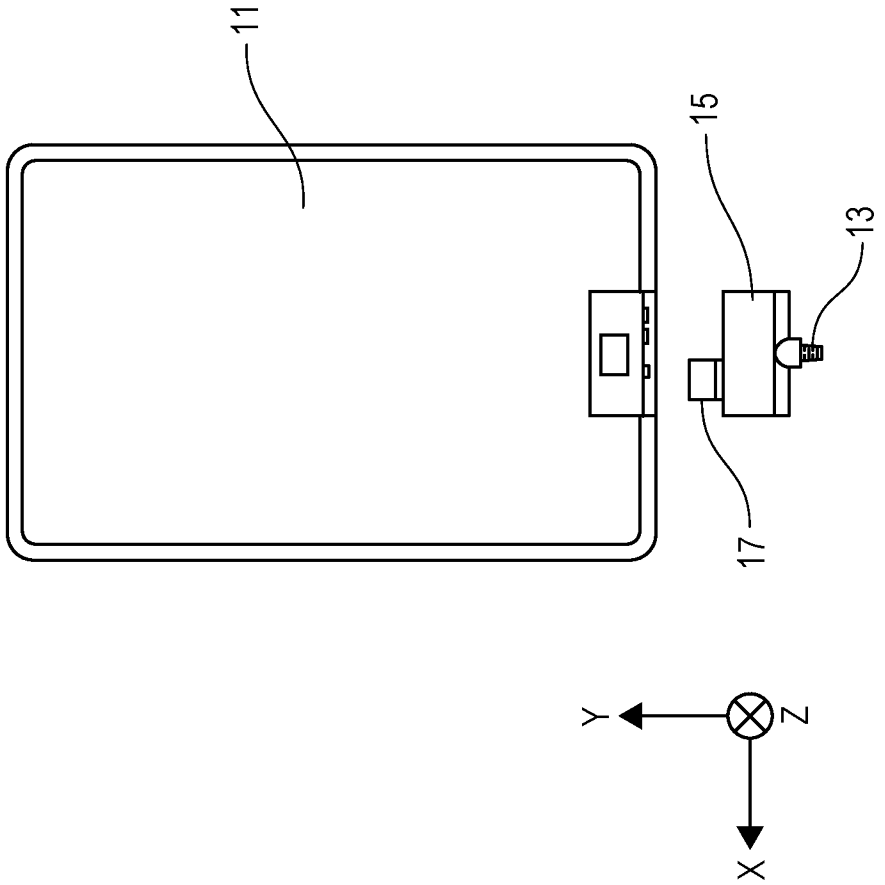
FIG. 3 is a view in which an adaptor is separated from the device body.

FIG. 3 is a view in which the adaptor 15 is separated from the device body 11. The adaptor 15 is provided with a connector 17 on a side opposite to a side connected to the wire 13. The connector 17 is physically coupled to a mating connector 19 (see FIG. 4) provided in the device body 11.

Figure 4:
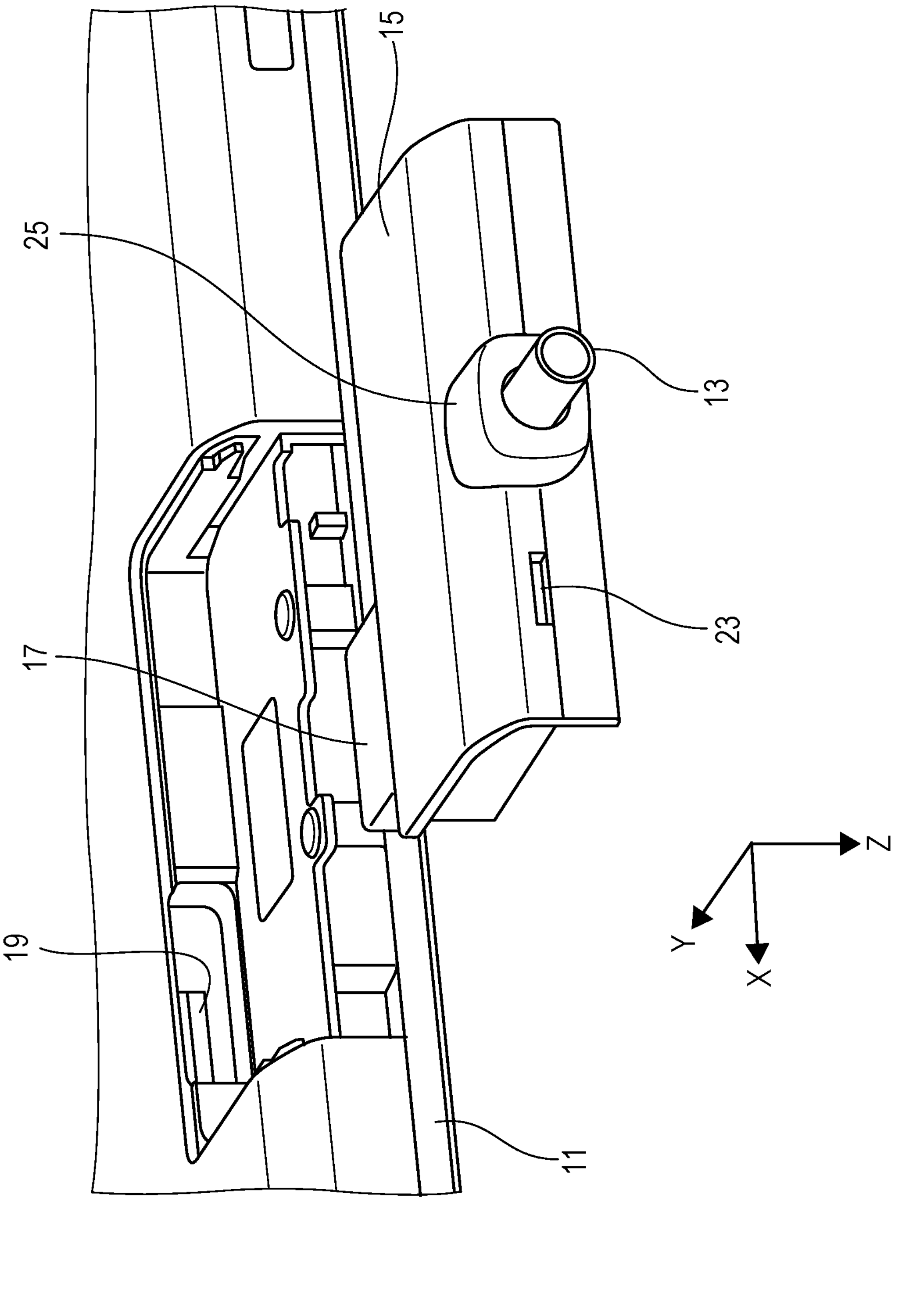
FIG. 4 is a view of a main portion in which the adaptor is separated from the device body.

FIG. 4 is a view of a main portion in which the adaptor 15 is separated from the device body 11. The adaptor 15 includes a tool insertion port 23 into which a tool 21 (see FIG. 15) is inserted when the adaptor 15 is detached (in other words, disconnected) from the device body 11. The tool insertion port 23 is provided closer to the connector 17 than the wire 13 in a direction (X direction) intersecting with a connection direction of the device body 11 and the adaptor 15. A shape of the tool insertion port 23 is not limited as long as the tool 21 having a rod shape or a plate shape can be inserted. The device body 11 is provided with the mating connector 19 to be coupled with the connector 17, on a back side in an insertion direction of the adaptor 15. Further, the device body 11 includes a fixing portion (to be described later) that fixes the adaptor 15 when the device body 11 is connected to the adaptor 15.

Figure 5:
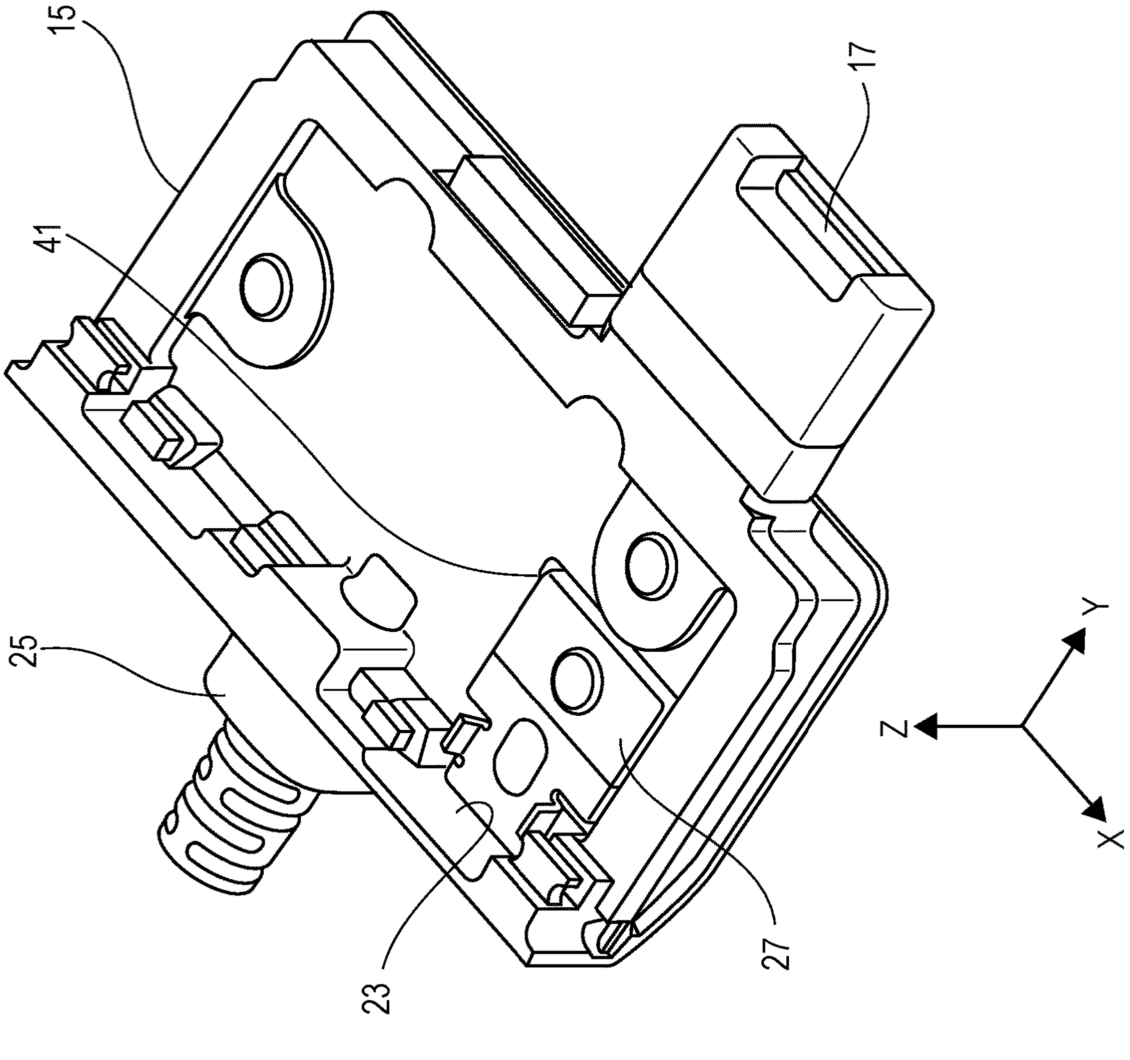
FIG. 5 is a diagram illustrating a configuration of the adaptor.

FIG. 5 is a diagram illustrating a configuration of the adaptor 15. The adaptor 15 includes, in addition to the above-described tool insertion port 23, a wire connection portion 25 that fixes the wire 13, one fixing metal plate 27 that fixes the adaptor 15 to the device body 11 when the adaptor 15 is connected to the device body 11, and the connector 17. In this specification, the fixing metal plate 27 is also collectively referred to as a lock portion. The fixing metal plate 27 is fixed to the adaptor 15 by screw fastening. That is, the fixing metal plate 27 is detachably attached to the adaptor 15 by a screw. The fixing metal plate 27 has flexibility to allow displacement of a lock claw portion in a direction (Z direction) intersecting with the connection direction of the device body 11 and the adaptor 15.

A fixing position of the fixing metal plate 27 is on the connector 17 side as viewed from the wire connection portion 25 in a direction (X direction) intersecting with the insertion direction (Y direction) of the adaptor 15. The insertion direction of the adaptor 15 is also referred to as the connection direction. When the adaptor 15 is pulled out, a moment is generated in the adaptor 15 using the lock mechanism as a fulcrum, and by arranging the connector 17 and the fixing metal plate 27 in a line in the connection direction (that is, the Y direction), a moment applied to the connector 17 can be reduced. Accordingly, a load placed on the connector 17 when force is applied to the adaptor 15 can be reduced. The position of the fixing metal plate 27 in the adaptor 15 is not limited thereto. Further, the fixing metal plate 27 may be increased in order to enhance the holding force. In this case, the tool insertion ports 23 are provided in the same number as the increased number of fixing metal plates 27.

Figure 6:
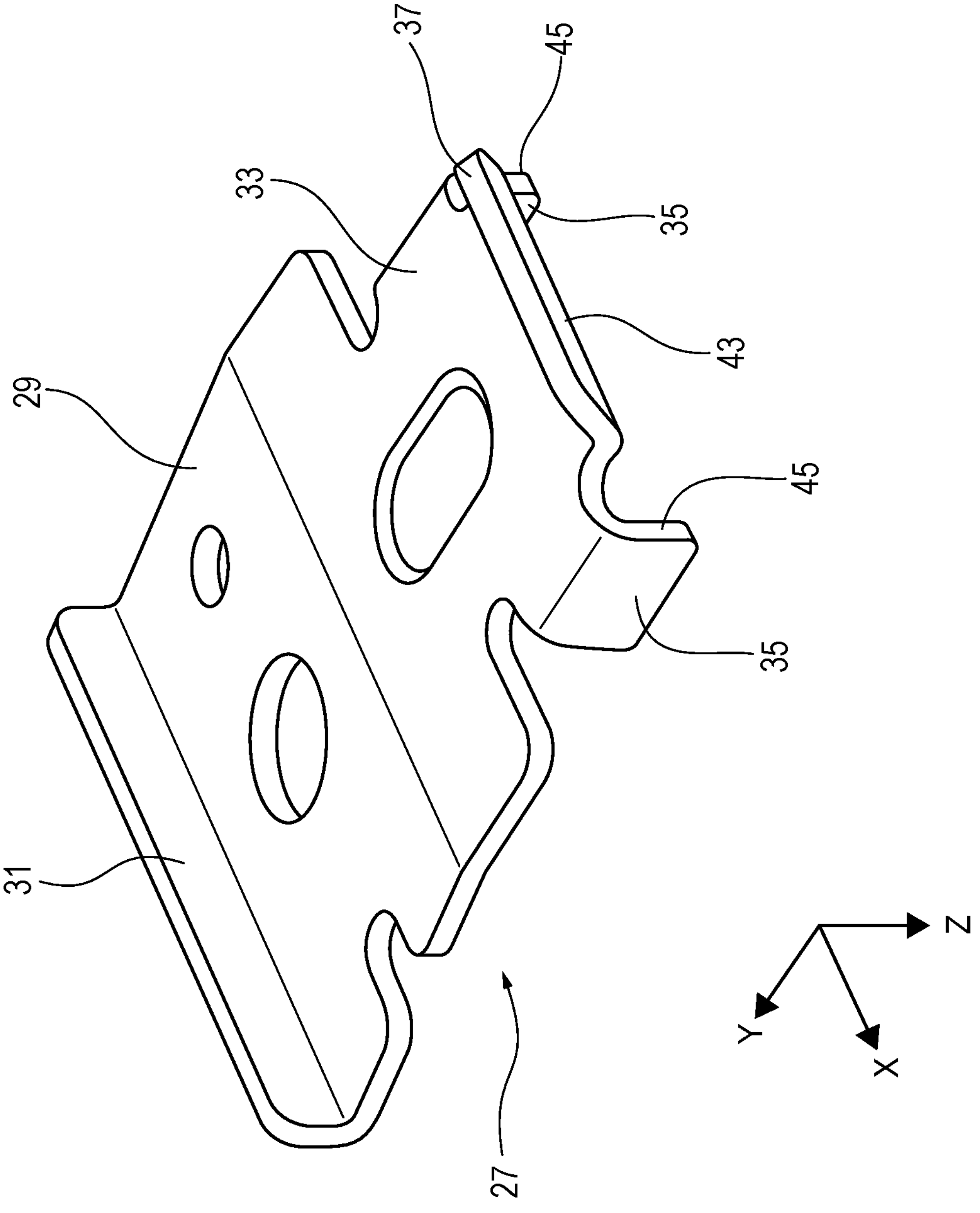
FIG. 6 is a diagram of a fixing metal plate that fixes the adaptor to the device body.

FIG. 6 is an outside diagram of the fixing metal plate 27 that fixes the adaptor 15 to the device body 11. The fixing metal plate 27 is formed by bending one stainless metal plate. A material of the fixing metal plate 27 may be another metal, plastic, or the like as long as the material can have elastic force. The fixing metal plate 27 includes an attachment portion 29, an insertion portion 31, a support portion 33, bent portions 35, and an inclined portion 37. In this specification, the bent portions 35 are also collectively referred to as the lock claw portions. The bent portion 35 is formed by bending the metal plate toward the fixing portion such that a thickness direction of the metal plate at a portion corresponding to the bent portion 35 coincides with the direction (X direction) intersecting with the connection direction.

When the adaptor 15 is connected, the bent portion 35 is provided in the same direction as the attachment portion 29 and at a position close to a fixing portion 39 when viewed from the fixing portion 39 (see FIG. 7) in the connection direction (Y direction), and is provided at a position closer to the fixing portion (Z side) than the attachment portion 29 in the direction intersecting with the connection direction (Z direction).

The tool insertion port 23 is provided in the same direction as the fixing portion 39 and at a position farther than the fixing portion 39 when viewed from the attachment portion 29 in the connection direction.

The attachment portion 29 is continuous with the insertion portion 31 formed by vertically bending an end on one side thereof. The insertion portion 31 is formed by bending the metal plate toward the adaptor 15. The fixing metal plate 27 is fixed by the screw fastening such that the insertion portion 31 is inserted into an inserted groove 41 (see FIG. 5) formed in the adaptor 15 and one surface (upper surface in FIG. 6) of the attachment portion 29 is in contact with the adaptor 15. An attachment method of the attachment portion 29 is not limited to the screw fastening, and the attachment portion 29 may be attached by another attachment method or may be integrally formed with the adaptor 15, and is not limited to this.

The support portion 33 is continuous with the attachment portion 29 at an end of the attachment portion 29 on an opposite side from the insertion portion 31. The support portion 33 is inclined by about 10 degrees in a direction away from the adaptor 15 (downward in FIG. 6) as compared with the attachment portion 29. The support portion 33 is continuous with the inclined portion 37 in the insertion direction of the adaptor 15. Further, the support portion 33 is continuous with the two bent portions 35 in the direction (X direction) intersecting with the insertion direction of the adaptor 15.

The inclined portion 37 is inclined in manner of being separated from the fixing portion 39 in the direction (Z direction) intersecting with the connection direction as approaching the tool insertion port 23 in the connection direction (Y direction). The inclined portion 37 is inclined by about 60 degrees in a direction approaching the adaptor 15 compared to the support portion 33. An angle between surfaces of the attachment portion 29 and the inclined portion 37 as viewed from the inclined portion 37 is formed to be larger than an angle between the attachment portion 29 and the support portion 33. An inclined surface 43 of the inclined portion 37 is a surface opposite to the attachment portion 29 in the insertion direction of the adaptor 15, and the fixing metal plate 27 is attached to the adaptor 15 such that the inclined surface 43 faces a direction of the tool insertion port 23 (lower right in FIG. 6).

The two bent portions 35 have the same shape. The two bent portions 35 are spaced apart from each other in the direction (X direction) intersecting with the insertion direction of the adaptor 15. The two bent portions 35 are provided symmetrically with respect to a center of the tool insertion port 23 when viewed in the connection direction. Each of the bent portions 35 has a fixing surface 45 on a tool insertion port side in the insertion direction of the adaptor 15. The fixing surface 45 is formed at a position closer to the inclined portion 37 than the attachment portion 29 in the insertion direction of the adaptor 15. In other words, in the insertion direction (Y direction) of the tool 21, an end (fixing surface 45) of the bent portion 35 on the tool insertion port side is provided at a position closer to the inclined portion 37 than the attachment portion 29.

An angle between surfaces of the fixing surface 45 and the support portion 33 is formed to be 90 degrees or more when viewed from an insertion portion side. The positions of the bent portions 35 may not be symmetrical when viewed from the support portion 33, and are not limited thereto. Further, the number of bent portions 35 may be one instead of two, or two or more bent portions 35 may be provided.

Figure 7:
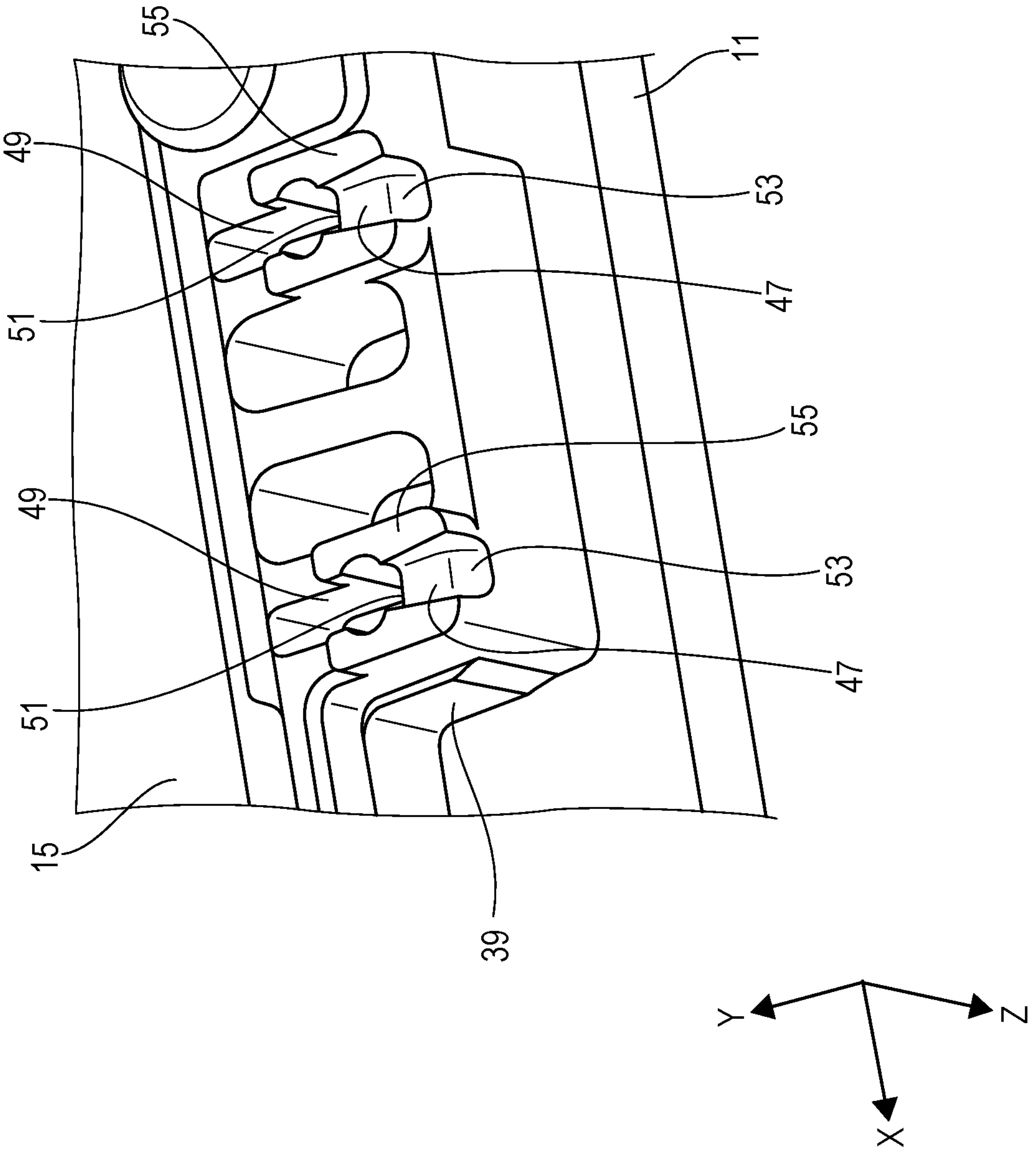
FIG. 7 is a diagram illustrating a fixing portion provided in the device body.

FIG. 7 is a diagram illustrating the fixing portion 39 provided in the device body 11. The fixing portion 39 is a mechanism that fixes the adaptor 15 to the device body 11 by hooking the fixing metal plate 27 by an operation to be described later when the device body 11 and the adaptor 15 are connected. The fixing portion 39 has latching portions 47 that hook the bent portions 35 of the fixing metal plate 27. The latching portions 47 are provided at positions corresponding to the bent portions 35 of the fixing metal plate 27.

Each of the latching portions 47 includes a fixed surface 51 facing a groove 49 provided on a device body side (upper left in FIG. 7) in the insertion direction of the adaptor 15, a guiding inclined surface 53 provided on an opposite side (lower right in FIG. 7) of the fixed surface 51, and a guide portion 55. The fixed surface 51 is provided perpendicular to the insertion direction of the adaptor 15. Further, a height of the guiding inclined surface 53 decreases toward a side opposite to the fixed surface 51. Further, the guide portion 55 is provided so as to be higher than an upper end of the fixed surface 51, and is formed such that a width in the direction (X direction) intersecting with the insertion direction of the adaptor 15 becomes wider toward the side (lower right in FIG. 7) opposite to the fixed surface 51 in the insertion direction of the adaptor 15.

Next, a connection operation of the adaptor 15 will be described.

Figure 8:
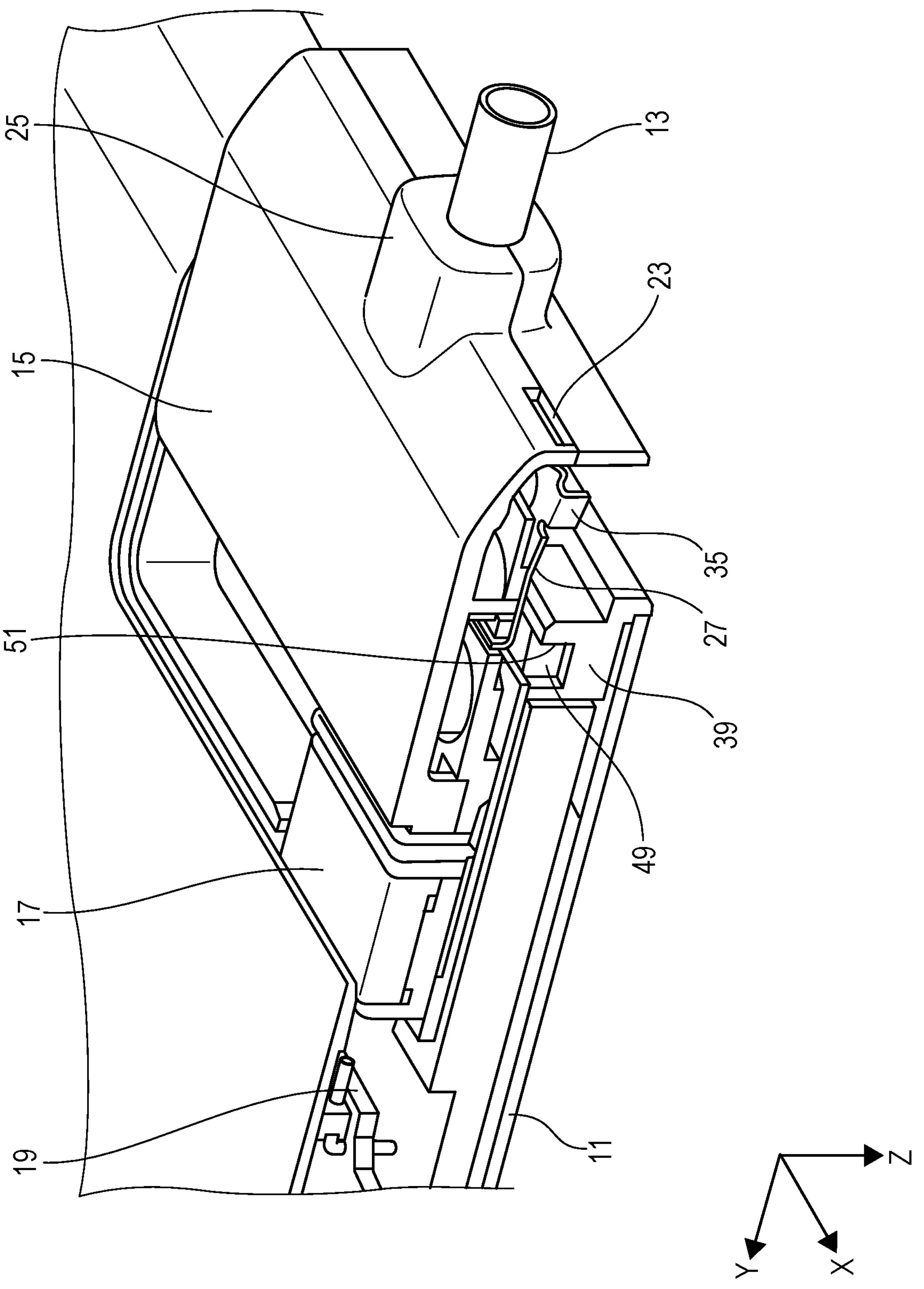
FIG. 8 is a diagram when the adaptor is attached to the device body (ST1).

FIG. 8 shows a diagram when the adaptor 15 is attached to the device body 11 (ST1). Immediately after starting the connection, the fixing metal plate 27 and the device body 11 are not in contact with each other.

Figure 9:
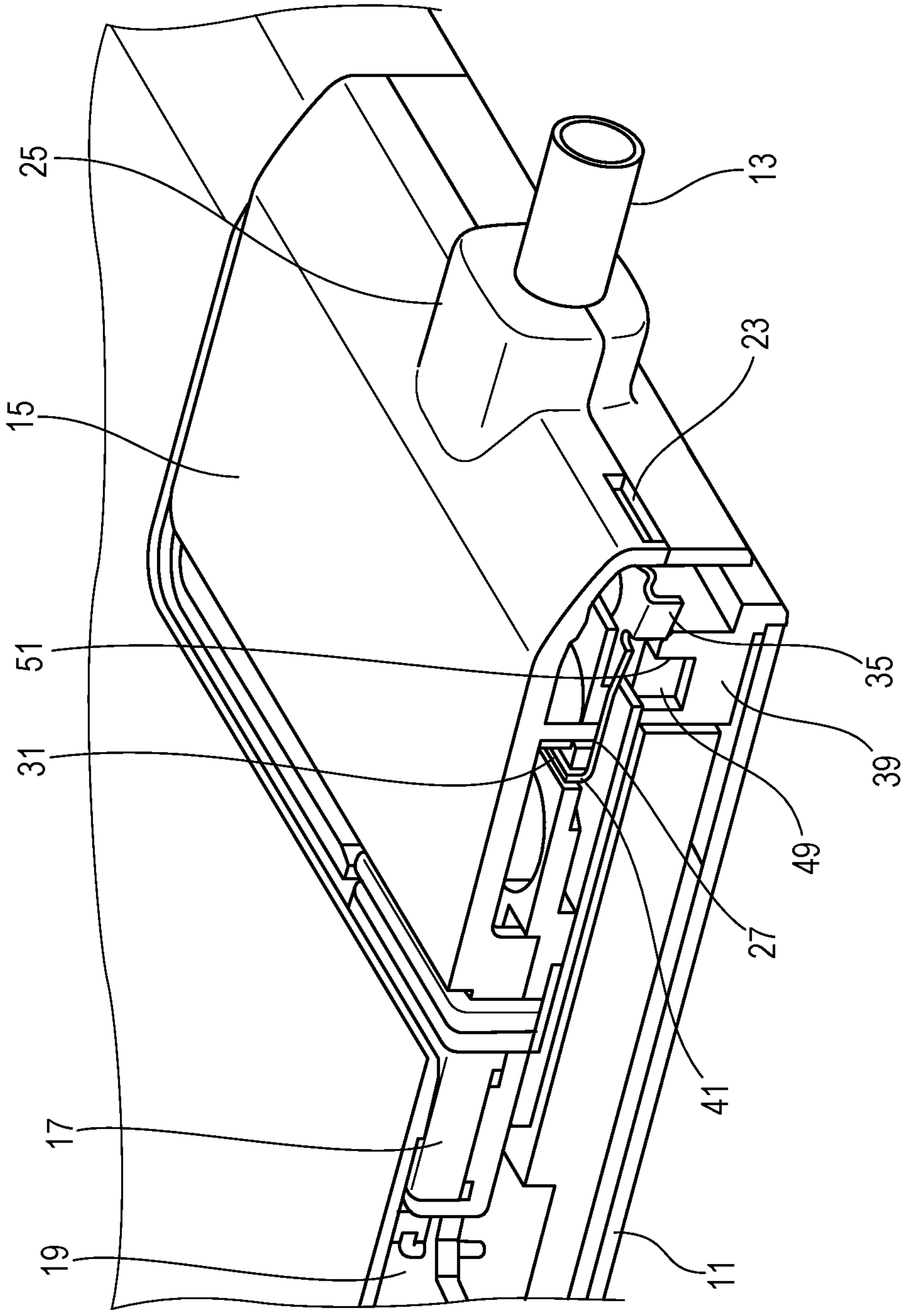
FIG. 9 is a diagram in the middle of attaching the adaptor to the device body (ST2).

FIG. 9 shows a diagram in the middle of attaching the adaptor 15 to the device body 11 (ST2). In the middle of the connection of the adaptor 15, the fixing metal plate 27 and the device body 11 are in contact with each other.

Figure 10:
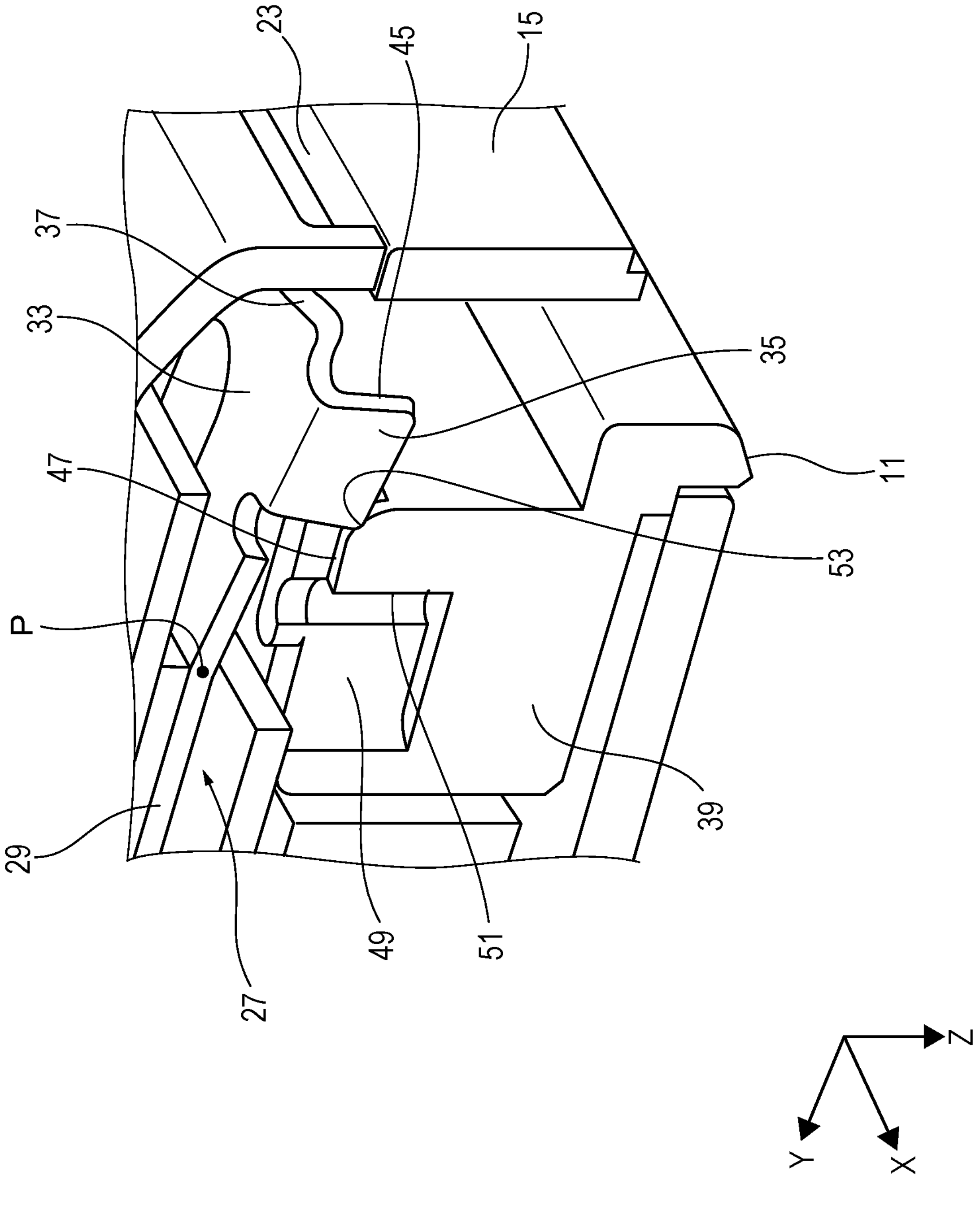
FIG. 10 is an enlarged diagram of a main portion in the middle of attaching the adaptor (ST2).

FIG. 10 is an enlarged diagram of a main portion in the middle of attaching the adaptor (ST2). When the adaptor 15 is moved in the insertion direction (Y direction) from the state (ST1) to reach the state (ST2), a tip (left side in FIG. 10) of the bent portion 35 of the fixing metal plate 27 in the insertion direction comes into contact with the guiding inclined surface 53. When the adaptor 15 is further moved in the insertion direction, the fixing metal plate 27 is bent upward in FIG. 10 with a boundary between the attachment portion 29 and the support portion 33 as a fulcrum P. Accordingly, as the adaptor 15 is inserted, the tip of the bent portion 35 moves upward along the guiding inclined surface 53.

Figure 11:
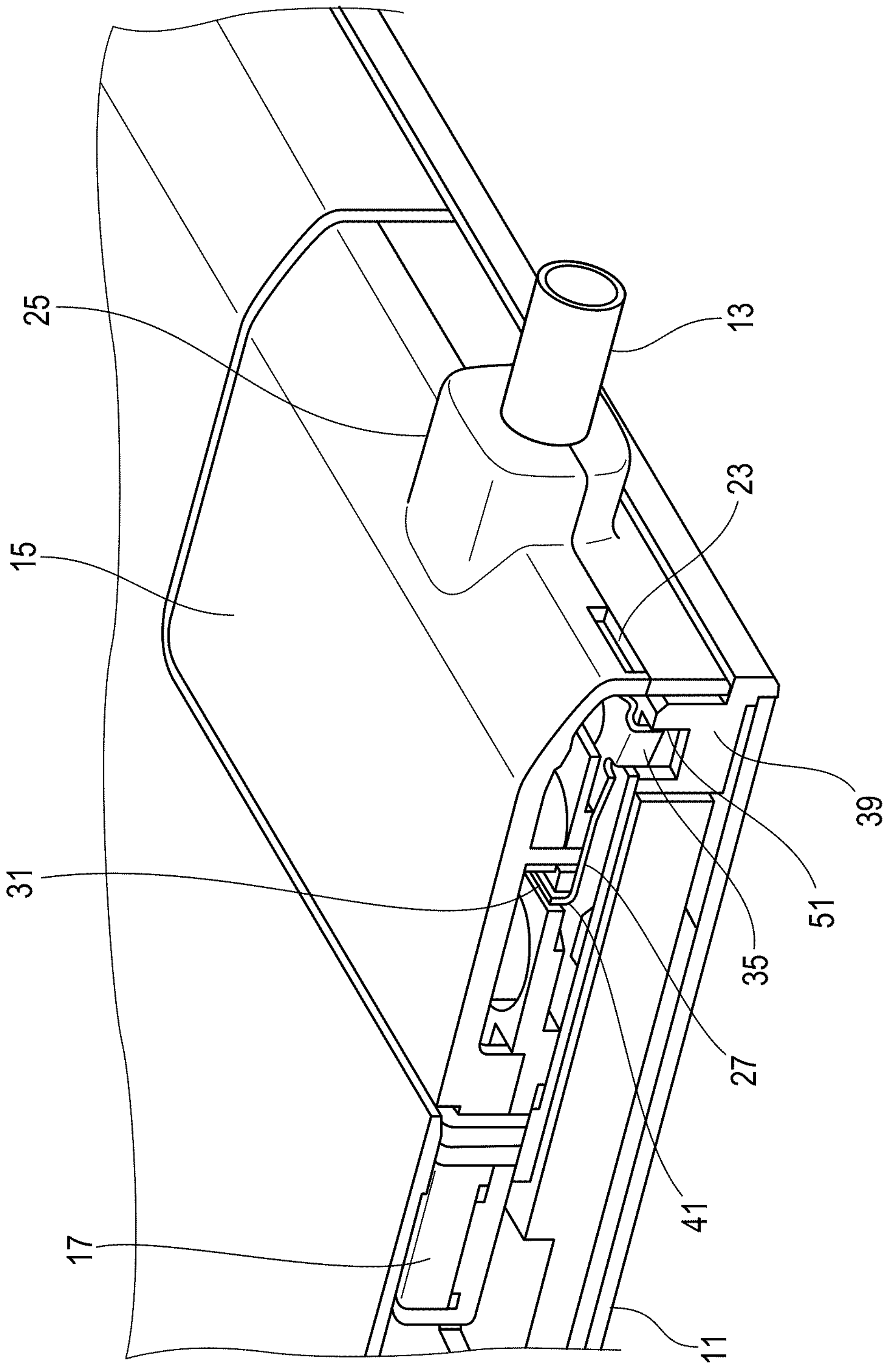
FIG. 11 is a diagram of a state (ST3) in which a bent portion is latched to the fixing portion.

FIG. 11 is a diagram of a state (ST3) in which the bent portion 35 is latched to the fixing portion 39. When the adaptor 15 is further moved in the insertion direction, the tip of the bent portion 35 passes over the guiding inclined surface 53.

Figure 12:
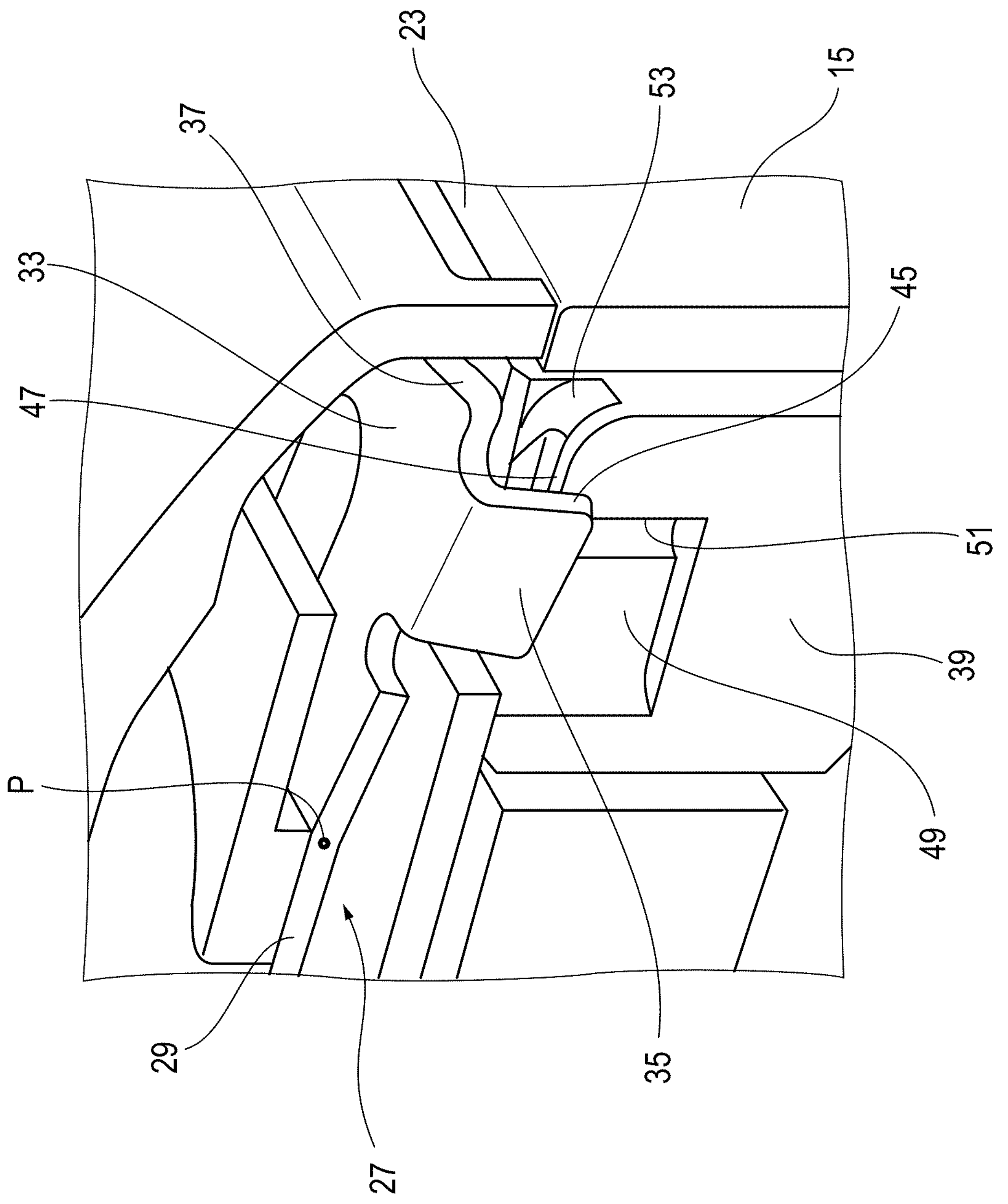
FIG. 12 is a diagram of a main portion in FIG. 11.

FIG. 12 is a diagram of a main portion in FIG. 11. In the state (ST3), the fixing metal plate 27 returns to an undeformed state due to elastic restoring force, and the bent portion 35 is inserted into the groove 49 of the fixing portion 39. At this time, the fixing surface 45 of the bent portion 35 is substantially perpendicular to the insertion direction of the adaptor 15 and comes into contact with the fixed surface 51 of the latching portion 47.

In the state (ST3), when force is applied in a direction (lower right in FIG. 12) in which the adaptor 15 is pulled out, the fixed surface 51 presses the fixing surface 45 of the fixing metal plate 27. At this time, since the bent portion 35 is disposed closer to the tool insertion port than the attachment portion 29, movement of the support portion 33 is prevented by the fixing portion 39.

Accordingly, a state in which the bent portion 35 is inserted into the groove 49 of the fixing portion 39 is maintained, and a connection state between the adaptor 15 and the device body 11 is maintained. Further, when the force is applied in the direction in which the adaptor 15 is pulled out, force is generated in the attachment portion 29 of the fixing metal plate 27 in a direction (Y direction) intersecting with a screw fastening direction. At this time, by providing the insertion portion 31 in the fixing metal plate 27, the insertion portion 31 bears a part of the force in the direction intersecting with the screw fastening direction, and thus a load generated on the attachment portion 29 can be reduced. That is, by providing the insertion portion 31, strength against the pulling-out of the adaptor 15 can be increased.

Figure 13:
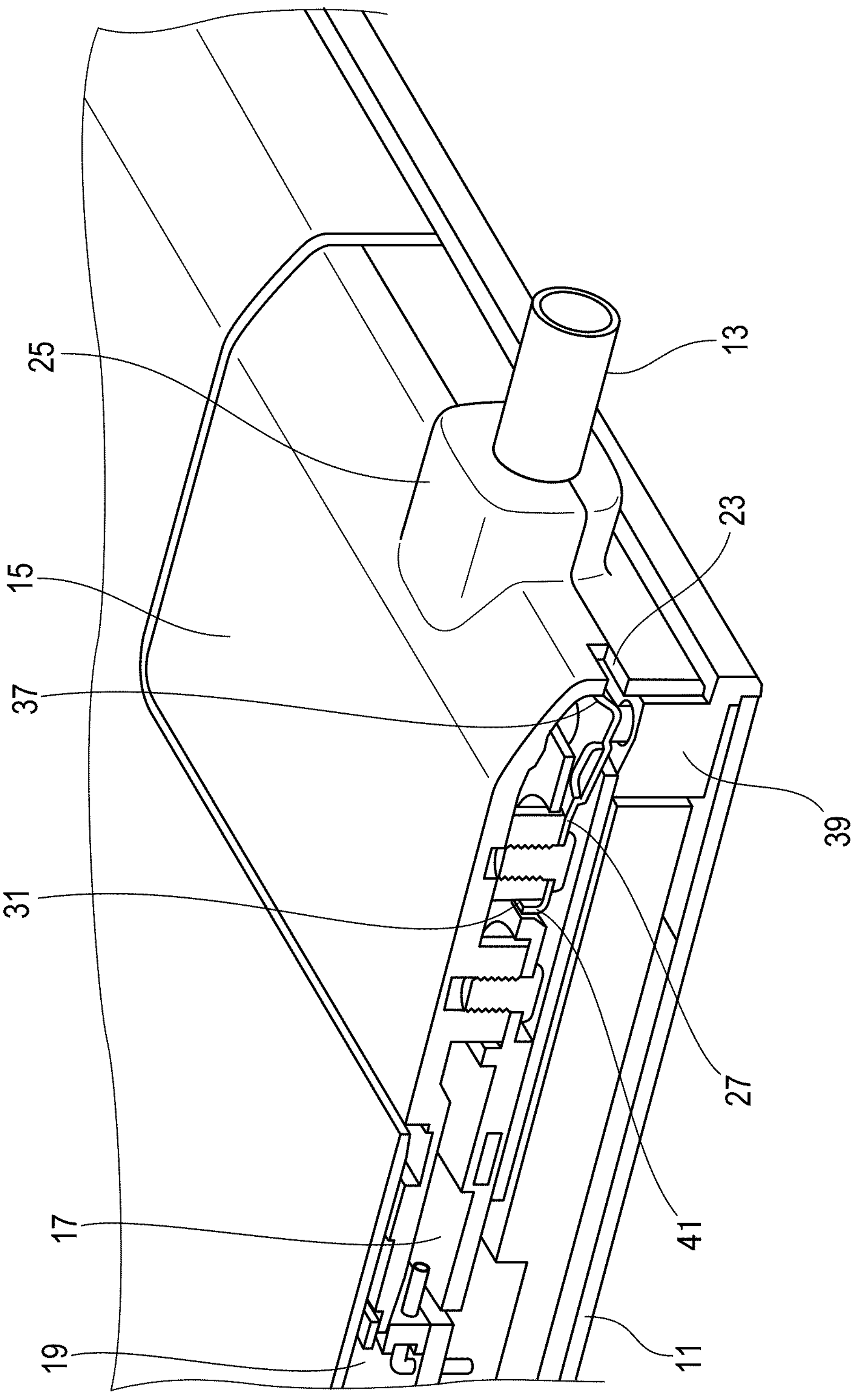
FIG. 13 is a cross-sectional view of a lock mechanism at a center of a tool insertion port in a state (ST3).

FIG. 13 is a cross-sectional view of the lock mechanism at the center of the tool insertion port 23 in the state (ST3). The fixing metal plate 27 includes the inclined portion 37 disposed in the vicinity of the tool insertion port 23 inside the adaptor 15.

Figure 14:
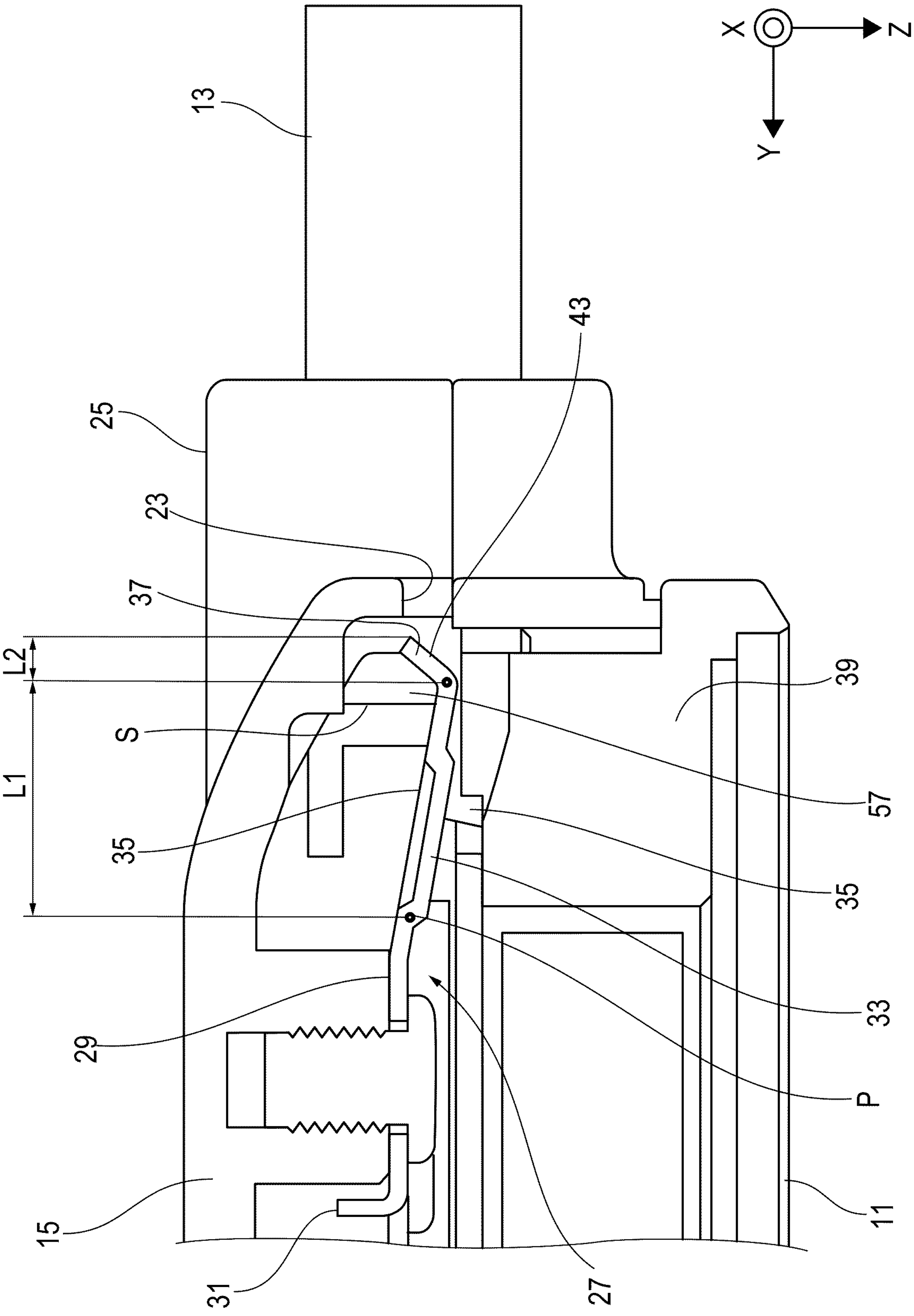
FIG. 14 is a side view of FIG. 13.

FIG. 14 is a side view of FIG. 13. The fixing metal plate 27 is attached by the screw fastening such that the attachment portion 29 contacts the adaptor 15. The inclined portion 37 is provided closer to the adaptor than a lower end of the tool insertion port 23 in a direction (Z direction) intersecting with the insertion direction of the tool 21.

A distance L1 from the fulcrum P to a boundary between the inclined portion 37 and the support portion 33 in the pulling-out direction of the adaptor 15 is longer than a distance L2 from the boundary between the inclined portion 37 and the support portion 33 to a tip of the inclined portion 37. Here, the fulcrum P is the boundary between the attachment portion 29 and the support portion 33, and indicates a portion where the fixing metal plate 27 is separated from the adaptor 15. The boundary between the inclined portion 37 and the support portion 33 (portion where an inclination of the fixing metal plate 27 changes from a direction away from the attachment portion to a direction towards the attachment portion 29) is located below an upper end of the tool insertion port 23 at least. Further, the tool insertion port 23 is provided at a position corresponding to the inclined portion 37 in a depth direction (left direction) in FIG. 14.

The adaptor 15 has a recess 57 between the attachment portion 29 of the fixing metal plate 27 and the tool insertion port 23. The recess 57 is provided with a size large enough to accommodate the inclined portion 37 in a state (state in FIG. 15) in which the boundary between the inclined portion 37 and the support portion 33 reaches a height of the upper end of the tool insertion port 23.

The recess 57 includes a movement stop surface S with which the inclined portion 37 moved by the tool 21 abuts. The movement stop surface S functions as a stopper that prevents the fixing metal plate 27 from being excessively deformed by the tool 21. Accordingly, the lock mechanism prevents plastic deformation of the support portion 33 toward the adaptor over time and a reduction in a latch allowance of the bent portion 35.

Figure 15:
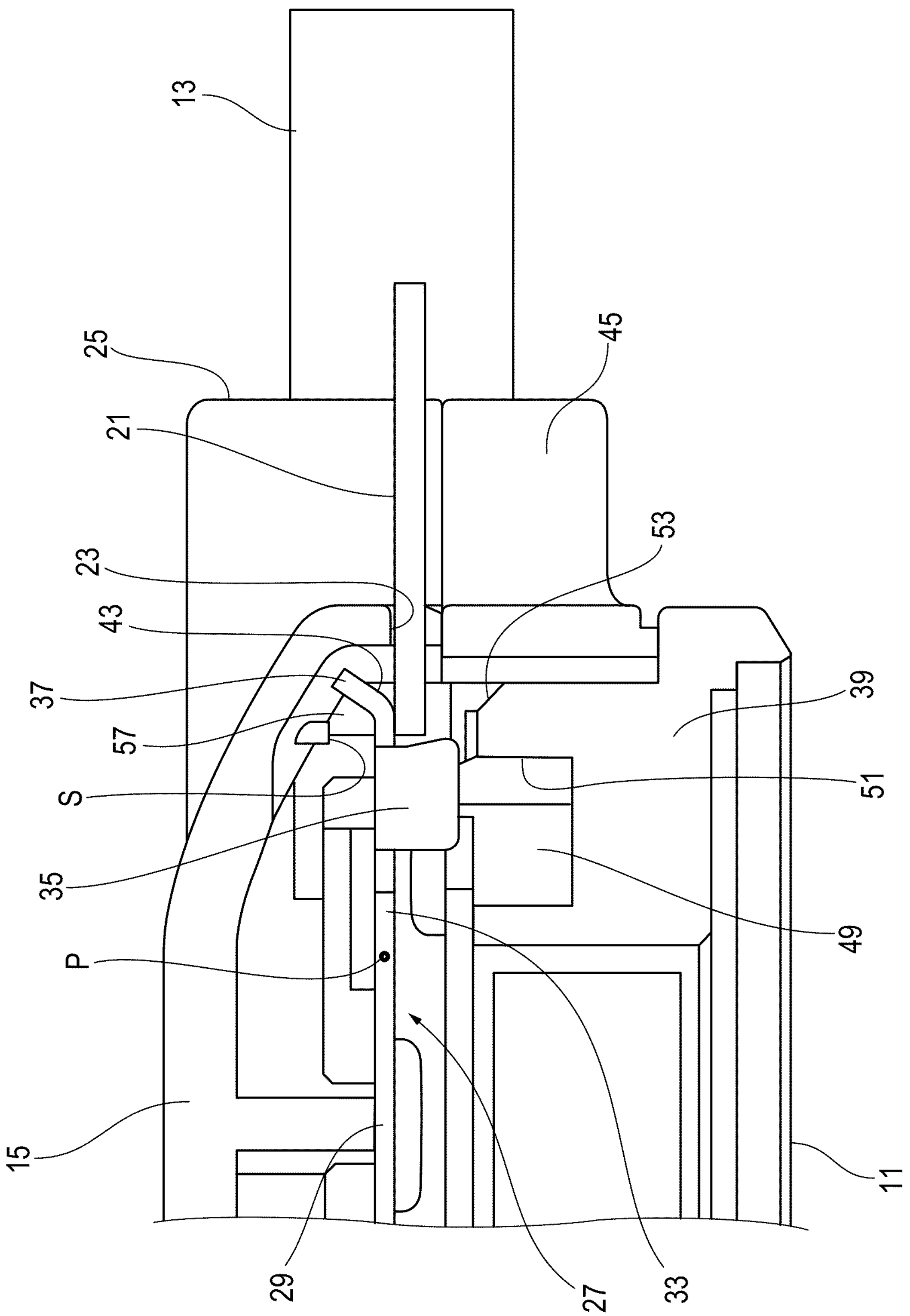
FIG. 15 is a diagram showing the bent portion being unlatched by an inserted tool.

FIG. 15 is a diagram showing the bent portion 35 being unlatched by the inserted tool 21. Hereinafter, an operation of detaching the adaptor 15 from the device body 11 will be described. When the tool 21 is inserted through the tool insertion port 23, the tool 21 reaches the inclined surface 43 of the inclined portion 37. Further, when the tool 21 is further moved in the insertion direction, the tool 21 comes into contact with the inclined surface 43, so that force acts in a direction (upward direction in FIG. 14) in which fixing of the bent portion 35 is released.

Accordingly, the fixing metal plate 27 is bent about the fulcrum P, and as shown in FIG. 15, the support portion 33 and the bent portion 35 move in the direction in which the fixing of the bent portion 35 is released, so that the fixing surface 45 and the fixed surface 51 are not in contact with each other. The adaptor 15 can be separated from the device body 11 by moving the adaptor 15 in the direction of pulling the adaptor 15 out from the device body 11 from this state.

The inclined portion 37 may be formed to have a plurality of inclinations, or may be formed into a curved surface by bending with a predetermined curvature. Further, the inclined portion 37 is not limited to a flat surface, a plurality of slopes, or a curved surface, as long as the inclined portion 37 is formed to be inclined toward an adaptor side with respect to the support portion 33 in the insertion direction of the tool 21.

Further, although the support portion 33 is formed to be inclined toward the fixing portion with respect to the attachment portion 29, the support portion 33 is not limited thereto as long as the distance L1 from the fulcrum P (boundary between the attachment portion 29 and the support portion 33) to the boundary between the inclined portion 37 and the support portion 33 is longer than the distance L2 from the boundary between the inclined portion 37 and the support portion 33 to the tip of the inclined portion 37. For example, the support portion 33 may be formed to have a plurality of inclinations or may be formed by bending with a predetermined curvature.

In the lock mechanism, the fixing metal plate 27 may be provided in the device body 11, and the fixing portion 39 may be provided in the adaptor 15.

Figure 16:
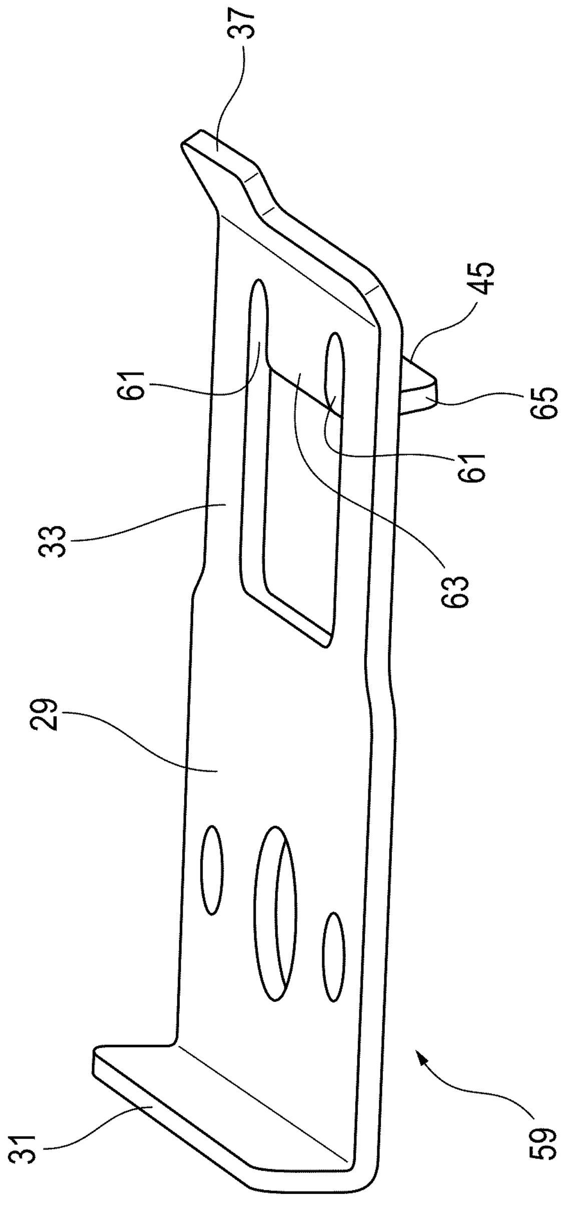
FIG. 16 is a diagram of a fixing metal plate according to a modification.

FIG. 16 is a diagram of a fixing metal plate 59 according to a modification. The fixing metal plate 59 may be formed flat such that the attachment portion 29 and the support portion 33 are on the same plane. In this case, the support portion 33 may be formed to have a width smaller than a width of the attachment portion 29 in the direction (X direction) intersecting with the insertion direction of the adaptor 15. The inclined portion 37 may be formed by making only a portion of the support portion 33 in a width direction protrude long in an inclined direction.

The support portion 33 may be provided with a slit 61 in which only one side in the X direction is left among four sides of a rectangular shape, and a thin plate portion 63 surrounded by the slit 61 may be bent at 90° or more with the left side as a boundary to form a bent portion 65.

According to the fixing metal plate 59, since the attachment portion 29 and the support portion 33 are flat, an accommodation space can be reduced. Since a surface of the bent portion 65 contacts the fixed surface 51 of the fixing portion 39, it is possible to prevent wear and strength reduction of the fixed surface 51.

Next, operations of the above-described configuration will be described.

The lock mechanism according to the first embodiment is the lock mechanism that fixes connection between the first housing and the second housing in the electronic device including the first housing and the second housing, the lock mechanism includes: the lock portion provided in one of the first housing and the second housing; and the fixing portion 39 provided in the other of the first housing and the second housing and configured to fix the lock portion by latching the lock portion in the direction intersecting with the connection direction of the first housing and the second housing, the lock portion includes the attachment portion 29 that attaches the lock portion to the one of the first housing and the second housing, and the lock claw portion latched to the fixing portion 39, and when the first housing and the second housing are connected, the lock claw portion is provided in the same direction as the attachment portion 29 and at the position close to the fixing portion 39 as viewed from the fixing portion 39 in the connection direction, and is provided closer to the fixing portion than the attachment portion 29 in the direction intersecting with the connection direction.

In the lock mechanism, for example, one of the first housing and the second housing is the adaptor 15. The other one of the first housing and the second housing is, for example, the device body 11. In the lock mechanism, the first housing may be the device body 11, and the second housing may be the adaptor 15. The adaptor 15 is provided with the lock portion. The device body 11 is provided with the fixing portion 39. When the lock portion is latched, the fixing portion 39 engages with the lock portion and stops the lock portion. As a result, the connection between the adaptor 15 and the device body 11 is fixed. The lock portion is the fixing metal plate 27.

The lock portion includes the attachment portion 29 that attaches the lock portion to the adaptor 15 and the lock claw portion latched to the fixing portion 39. The lock claw portion is the bent portion 35.

When the adaptor 15 and the device body 11 are connected to each other, the lock claw portion is provided in the same direction as the attachment portion 29 and at the position close to the fixing portion 39 when viewed from the fixing portion 39 in the connection direction. Further, the lock claw portion is provided closer to the fixing portion than the attachment portion 29 in the direction intersecting with the connection direction.

Here, the "connection direction" is the insertion direction (Y direction) of the adaptor 15. Therefore, the lock claw portion of the lock portion attached to the adaptor 15 is located on a front side of the attachment portion 29 on the back side in the insertion direction of the adaptor 15. Further, the lock claw portion is located closer to the fixing portion than the attachment portion 29 in the direction intersecting with the insertion direction.

The insertion direction of the adaptor 15 is a linear direction. The lock claw portion is located on a straight line obtained by translating a straight line passing through the attachment portion 29 in the insertion direction of the adaptor 15 to a fixing portion side.

In the lock mechanism, in the insertion direction of the adaptor 15, a rear end (fixing surface 45) of the lock claw portion in the insertion direction is latched to the fixing portion 39 and fixed. When the adaptor 15 is pulled in a direction opposite to the insertion direction in a state in which the connection with the device body 11 is fixed, an end of the lock claw portion is pressed against the lock portion. At this time, in the lock portion, since the lock claw portion is located closer to the fixing portion than the attachment portion 29, reaction force that the lock claw portion receives from the fixing portion 39 generates a moment that causes the lock claw portion to rotate in a direction toward the fixing portion 39. That is, the lock claw portion is displaced in a direction in which the lock claw portion is latched to the fixing portion 39 more. Accordingly, the latch allowance of the lock mechanism increases according to tensile force.

As a result, the lock mechanism can increase the holding force according to the vibration of the aircraft or the load at the time of pulling-out performed by the passenger.

Further, in the lock mechanism, the lock claw portion is provided in the lock portion, and the lock claw portion is disposed at a rear in the insertion direction of the adaptor 15, and it is possible to elastically deform the lock portion using a relatively short and simple shaped tool 21. As a result, the lock mechanism can release the lock claw portion latched to the fixing portion 39 even with the general-purpose tool 21.

Further, in the lock mechanism, the lock portion has flexibility to allow the displacement of the lock claw portion in the direction intersecting with the connection direction.

In this lock mechanism, the lock portion has flexibility to allow the displacement of the lock claw portion in the direction intersecting with the connection direction of the adaptor 15. Due to the flexibility of the lock portion, the lock claw portion can be deformed between a position where the lock claw portion is latched to the fixing portion 39 and fixed and a position where the lock claw portion is unlatched from the fixing portion 39 and the fixing is released. This deformation is within an elastic deformation range.

In the lock mechanism, in the process of inserting the adaptor 15 into the device body 11, first, the lock claw portion comes into contact with the fixing portion 39. When the adaptor 15 is further inserted, the lock claw portion receives the reaction force from the fixing portion 39 and is elastically deformed in a direction away from the fixing portion 39. Further, when the adaptor 15 is inserted and the lock claw portion reaches a latching position of the fixing portion 39, the lock claw portion elastically returns and is latched to the fixing portion 39. When the lock claw portion of the lock portion is latched to the fixing portion 39, movement of the adaptor 15 in the pulling-out direction from the device body 11 is restricted, and the adaptor 15 is fixed to the device body 11 (prevented from coming off).

In the lock mechanism, the attachment portion 29 is detachably provided on one of the first housing and the second housing.

In this lock mechanism, the attachment portion 29 of the lock portion is detachably attached to the adaptor 15. When the device body 11 is pulled by excessive force, for example, the force is easily applied to the lock portion, and the lock portion may be plastically deformed. Since the lock portion is detachable, the lock portion can be easily replaced. As a result, the lock mechanism can improve maintenance performance of the adaptor 15 and the device body 11 provided in the aircraft.

Further, in the lock mechanism, the lock portion is formed of one metal plate.

In this lock mechanism, the lock portion is formed of one metal plate. That is, the lock portion may be the fixing metal plate 27. The fixing metal plate 27 is a single member and can be mass-produced at a lower cost by press working. Even in the case of breakage due to excessive external force, maintenance can be improved only by replacing the single member.

In the lock mechanism, the lock claw portion is formed by bending the metal plate toward the fixing portion such that the thickness direction of the metal plate becomes a direction intersecting the connection direction.

In this lock mechanism, the lock claw portion is formed by bending the metal plate toward the fixing portion. In the bent lock claw portion, the thickness direction of the metal plate is the direction (X direction) intersecting with the connection direction of the adaptor 15.

When the lock claw portion is latched to the fixing portion 39, the lock claw portion restricts the movement of the adaptor 15 in the pulling-out direction from the device body 11. That is, the adaptor 15 is fixed to the device body 11 (prevented from coming off). When the adaptor 15 is pulled in the pulling-out direction in a state of being fixed to the device body 11, the reaction force from the fixing portion 39 acts on the lock claw portion.

At this time, since the lock claw portion is bent in a direction in which the thickness direction of the metal plate intersects with the connection direction of the adaptor 15, the reaction force from the fixing portion 39 is applied in a surface direction of the metal plate. Therefore, buckling strength of the bent portion 35 can be increased compared to a structure in which the reaction force is applied in a plate thickness direction of the metal plate. As a result, when force is applied in the direction in which the adaptor 15 is pulled out, the force is not easily applied in the direction in which the bent portion 35 is detached, and connection strength between the adaptor 15 and the device body 11 can be increased.

Further, the lock mechanism formed by bending the lock claw portion into the lock portion can increase strength at the time of connection even with a small number of components.

In the lock mechanism, the lock portion includes the insertion portion 31 which is continuous with the attachment portion 29 and which is formed by bending the metal plate on one of the first housing and the second housing.

In this lock mechanism, the attachment portion 29 includes the insertion portion 31 on a tip side opposite to the lock claw portion in the insertion direction of the adaptor 15. The insertion portion 31 is inserted into the inserted groove 41 or the like formed in the adaptor 15. By inserting the insertion portion 31 of the attachment portion 29 into the inserted groove 41 of the adaptor 15, the lock mechanism can reduce the load applied to the attachment portion 29 when force is applied in a direction of removing the adaptor 15. For example, when the attachment portion 29 is fastened and fixed to the adaptor 15 by a screw, load applied to a screw fastening portion can be reduced.

In the lock mechanism, the first housing further has the tool insertion port 23 for inserting the tool 21 that releases the connection between the first housing and the second housing, the tool insertion port 23 being provided in the same direction as the fixing portion 39 and at the position farther than the fixing portion 39 when viewed from the attachment portion 29 in the connection direction, and the lock portion further includes the inclined portion 37 that is inclined in manner of being separated from the fixing portion 39 in the direction intersecting with the connection direction as the inclined portion 37 approaches the tool insertion port 23 in the connection direction.

In this lock mechanism, the adaptor 15 has the tool insertion port 23, and the lock portion has the inclined portion 37. In the adaptor 15, the inclined portion 37 of the lock portion is disposed in the vicinity of the tool insertion port 23 in the housing. That is, the adaptor 15 allows easy access to the inclined portion 37 by inserting the tool 21 into the tool insertion port 23 from an outside.

In the lock portion, in the insertion direction of the adaptor 15, the attachment portion 29, the bent portion 35, and the inclined portion 37 are located in this order from a tip side in the insertion direction. In other words, the inclined portion 37 of the lock portion is located at a rear end in the insertion direction of the adaptor 15. Accordingly, the lock mechanism allows the tool 21 to easily access the inclined portion 37 through the tool insertion port 23 over a short distance.

The lock mechanism can push the inclined portion 37 with a tool tip by inserting the general-purpose tool 21. In the lock portion, since the support portion 33 supporting the bent portion 35 is lifted in a direction away from the fixing portion 39, the bent portion 35 latched to the fixing portion 39 can be removed. Accordingly, even with the general-purpose tool 21, the connection between the adaptor 15 and the device body 11 can be removed.

In the lock mechanism, one of the first housing and the second housing provided with the lock portion has the recess 57 at a position between the attachment portion 29 and the tool insertion port 23 in the insertion direction of the tool 21.

In the lock mechanism, one of the first housing and the second housing provided with the lock portion has the recess 57 at the position between the attachment portion 29 and the tool insertion port 23 in the insertion direction of the tool 21. One of the first housing and the second housing is, for example, the adaptor 15.

In the lock portion provided in the adaptor 15, the lock claw portion is provided closer to the fixing portion than the attachment portion 29 in the direction intersecting with the connection direction. That is, the lock portion that is stopped by latching the lock claw portion to the fixing portion 39 is removed from the fixing portion 39 by moving the lock claw portion in a direction away from the fixing portion 39. When the lock claw portion is moved in the direction away from the fixing portion 39, the lock portion can be stored in the recess 57 by causing the inclined portion 37 to enter into the recess 57 formed in the adaptor 15.

In the lock mechanism, in the insertion direction of the tool 21, an end of the lock claw portion on a tool insertion port side is provided at a position closer to the inclined portion 37 than the attachment portion 29.

In this lock mechanism, the end (fixing surface 45) of the lock claw portion on the tool insertion port side is provided at the position closer to the inclined portion 37 than the attachment portion 29. When the tool 21 is inserted, the lock claw portion moves using the boundary between the attachment portion 29 and the support portion 33 as the fulcrum. In the lock portion, when the inclined portion 37 is lifted by the tool 21 and the lock claw portion is removed from the fixing portion 39, a movement distance of the inclined portion 37 becomes the largest.

The movement distance increases as approaching the tool insertion port 23. Therefore, the end of the lock claw portion on the tool insertion port side is provided at the position close to the inclined portion 37, and large movement distance can be ensured for lock releasing.

In the lock portion, the lock claw portion can be moved in the direction of removing the lock claw portion from the fixing portion 39 efficiently relative to an amount of pushing out the support portion 33 in the insertion direction of the tool 21, and operating force can be efficiently converted into lock release force.

In the lock mechanism, the lock portion further includes the support portion 33 that connects the lock claw portion and the attachment portion 29, and the angle between the attachment portion 29 and the inclined portion 37 is larger than the angle between the attachment portion 29 and the support portion 33.

In this lock mechanism, the angle between the attachment portion 29 and the inclined portion 37 is larger than the angle between the attachment portion 29 and the support portion 33. That is, the inclined portion 37 is formed with a steep inclination.

Since an angle between the inclined portion 37 and the tool 21 as viewed from the tool insertion port 23 becomes large, the support portion 33 can be largely pushed up with respect to the amount of pushing out the support portion 33 in the insertion direction of the tool 21. When the angle of the inclined portion 37 is steep, the movement distance of the lock claw portion is increased. Accordingly, in the lock mechanism, the amount by which the support portion 33 is pushed out by the tool 21 is reduced, so that the lock claw portion can be moved in the direction of remove the lock claw portion from the fixing portion 39 more efficiently.

In the lock mechanism, the lock claw portions are provided symmetrically with respect to a center of the tool insertion port 23 when viewed from the connection direction.

In this lock mechanism, the lock claw portions are provided symmetrically with respect to the center of the tool insertion port 23 when viewed in the connection direction. That is, two lock claw portions are located symmetrically with respect to the center of the tool insertion port 23. Accordingly, depending on a position where the tool 21 abuts, a difference is less likely to occur in lifting distances between the two lock claw portions. As a result, difficulty in lock releasing due to misalignment of the two lock claw portions can be prevented.

In the lock mechanism, the fixing portion 39 includes the guiding inclined surfaces 53 and the guide portions 55 that guide the lock portion to be latched.

In the lock mechanism, the fixing portion 39 includes the guiding inclined surfaces 53 and the guide portions 55 that guide the lock claw portion of the lock portion to be latched. The lock portion is provided in, for example, the adaptor 15. The adaptor 15 is inserted and connected to the electronic device. At this time, the lock portion is latched to the fixing portion 39 and stopped by latching the lock claw portion in the direction (Z direction) intersecting with the connection direction.

As described above, in the process of inserting the adaptor 15 into the device body 11, the lock claw portion of the lock portion first abuts on the fixing portion 39. When the adaptor 15 is further inserted, the lock claw portion receives the reaction force from the fixing portion 39 and is elastically deformed in a direction away from the fixing portion 39. Further, when the adaptor 15 is inserted and the lock claw portion reaches a latching position of the fixing portion 39, the lock claw portion elastically returns and is latched to the fixing portion 39.

In the process of latching the lock claw portion, the lock claw portion is guided to the latching position by the guide portions 55 on both sides while riding on the guiding inclined surfaces 53.

Accordingly, it is possible to prevent the lock claw portion from being deformed within the predetermined elastic deformation range when the adaptor 15 and the device body 11 are connected, and to prevent the lock claw portion from being deviated from a predetermined trajectory and plastically deformed when the adaptor 15 and the device body 11 are connected.

In the lock mechanism, the first housing further includes the connector 17 configured to be connected to the second housing and the wire 13 provided on an opposite side of the connector 17 in the direction of connecting with the connector 17, and the tool insertion port 23 is provided closer to the connector than the wire 13 in the direction intersecting with the connection direction.

In this lock mechanism, the tool insertion port 23 is provided closer to the connector than the wire 13 in the direction intersecting with the connection direction. The wire 13 provided in the adaptor 15 is drawn out substantially coaxially with a bisector parallel to the connection direction of the connector 17. On the other hand, the connector 17 provided in the adaptor 15 on the side opposite to the wire 13 is provided at a position deviated from the wire 13.

When the adaptor 15 is attached to the device body 11, the connector 17 is coupled to the mating connector 19 provided in the device body 11.

The adaptor 15 is pulled out from the device body 11 by removing the latching of the lock claw portion from the attached state, and is removed. At this time, first, the inclined portion 37 of the lock portion is pushed by the tool 21 inserted into the tool insertion port 23, and the lock claw portion is removed from the fixing portion 39. In this state, the wire of the adaptor 15 is pulled, and the connector 17 is disconnected from the mating connector 19.

In the adaptor 15, since a point of application of the reaction force at the time of releasing the fastening received from the mating connector 19 and a point of application of tensile force applied at a wire position are misaligned, the moment around the connector 17 is generated. This moment causes terminals of the connector 17 and the mating connector 19 to separate from each other in a non-linear direction. Since the terminals are separated from each other in the non-linear direction, wear due to pin breakage or a solder crack is more likely to occur.

In this lock mechanism, since the tool insertion port 23 is provided on the connector side, the moment caused by the misalignment between the reaction force received from the mating connector 19 when the fastening is released and the tensile force at the wire position is prevented. That is, by providing the lock mechanism and the tool insertion port 23 coaxially with the connector 17, a moment load applied to the connector 17 is reduced, and thus the wear caused by the pin breakage and the solder crack can be prevented.

Therefore, according to the lock mechanism according to the first embodiment, it is possible to withstand the vibration of the aircraft and the load generated when the passenger performs the pulling-out, and to release the lock in a short time using the general-purpose tool 21.

(Summary of Present Disclosure)

From the above description of the embodiments, technical ideas corresponding to the following items are disclosed.

(Item 1)

A lock mechanism that fixes connection between a first housing and a second housing in an electronic device including the first housing and the second housing, the lock mechanism including:

- a lock portion provided in one of the first housing and the second housing; and
- a fixing portion provided in the other of the first housing and the second housing and configured to fix the lock portion by latching the lock portion in a direction intersecting with a connection direction of the first housing and the second housing, in which
- the lock portion includes
  - an attachment portion that attaches the lock portion to the one of the first housing and the second housing, and
  - a lock claw portion latched to the fixing portion, and
- when the first housing and the second housing are connected, the lock claw portion is provided in the same direction as the attachment portion and at a position closer to the fixing portion than the attachment portion as viewed from the fixing portion in the connection direction, and is provided closer to the fixing portion than the attachment portion in the direction intersecting with the connection direction.

Accordingly, the lock mechanism can increase the holding force according to the vibration of the aircraft or the load at the time of pulling-out performed by the passenger.

(Item 2)

The lock mechanism according to item 1, in which the lock portion has flexibility to allow displacement of the lock claw portion in the direction intersecting with the connection direction.

Accordingly, when the lock claw portion of the lock portion is latched to the fixing portion, the movement of the adaptor in the pulling-out direction from the device body is restricted, and the adaptor can be fixed to the device body (prevented from coming off).

(Item 3)

The lock mechanism according to item 1 or 2, in which the attachment portion is detachably provided on the one of the first housing and the second housing.

Accordingly, the lock mechanism can improve the maintenance performance of the adaptor and the device body provided in the aircraft.

(Item 4)

The lock mechanism according to any one of items 1 to 3, in which the lock portion is formed of one metal plate.

Accordingly, mass production can be performed at a low cost. Even in the case of breakage due to excessive external force, maintenance can be improved only by replacing the single member.

(Item 5)

The lock mechanism according to item 4, in which the lock claw portion is formed by bending the metal plate toward the fixing portion such that a thickness direction of the metal plate is a direction intersecting with the connection direction.

Accordingly, the lock mechanism can increase the strength at the time of connection even with the small number of components.

(Item 6)

The lock mechanism according to item 4 or 5, in which the lock portion includes an insertion portion that is continuous with the attachment portion and formed by bending the metal plate on one side of the first housing and the second housing.

Accordingly, by inserting the insertion portion of the attachment portion into the inserted groove of the adaptor, the lock mechanism can reduce the load applied to the attachment portion when the force is applied in the direction of removing the adaptor.

(Item 7)

The lock mechanism according to any one of items 1 to 6, in which the first housing further has a tool insertion port for inserting a tool that releases the connection between the first housing and the second housing, the tool insertion port being provided in the same direction as the fixing portion and at a position farther than the fixing portion when viewed from the attachment portion in the connection direction, and the lock portion further includes an inclined portion inclined in manner of being separated from the fixing portion in the direction intersecting with the connection direction as the inclined portion approaches the tool insertion port in the connection direction.

Accordingly, the lock mechanism can remove the connection between the adaptor and the device body even with the general-purpose tool.

(Item 8)

The lock mechanism according to item 7, in which the one of the first housing and the second housing provided with the lock portion has a recess at a position between the attachment portion and the tool insertion port in an insertion direction of the tool.

Accordingly, when the lock claw portion is moved in the direction away from the fixing portion, the lock portion can be stored in the recess by causing the inclined portion to enter the recess formed in the adaptor.

(Item 9)

The lock mechanism according to item 7 or 8, in which an end of the lock claw portion on a tool insertion port side is provided at a position closer to the inclined portion than the attachment portion in the insertion direction of the tool.

Accordingly, in the lock portion, the lock claw portion can be moved in the direction of removing the lock claw portion from the fixing portion efficiently relative to the amount of pushing out the support portion in the insertion direction of the tool, and the operating force can be efficiently converted into the lock release force.

(Item 10)

The lock mechanism according to any one of items 7 to 9, in which the lock portion further includes a support portion that connects the lock claw portion and the attachment portion, and an angle between the attachment portion and the inclined portion is larger than an angle between the attachment portion and the support portion.

Accordingly, in the lock mechanism, the amount by which the support portion is pushed out by the tool is reduced, so that the lock claw portion can be moved in the direction of remove the lock claw portion from the fixing portion more efficiently.

(Item 11)

The lock mechanism according to any one of items 7 to 10, in which the lock claw portions are provided symmetrically with respect to a center of the tool insertion port when viewed from the connection direction.

Accordingly, the lock mechanism can prevent the difficulty in the lock release due to the misalignment of the two lock claw portions.

(Item 12)

The lock mechanism according to any one of items 1 to 11, in which the fixing portion includes a guiding inclined surface and a guide portion that guide the lock portion to be latched.

Accordingly, it is possible to prevent the lock claw portion from being deformed within the predetermined elastic deformation range when the adaptor and the device body are connected, and to prevent the lock claw portion from being deviated from the predetermined trajectory and plastically deformed when the adaptor and the device body are connected.

(Item 13)

The lock mechanism according to any one of items 1 to 12, in which the first housing further includes a connector configured to be connected to the second housing, and a wire provided on a side opposite to the connector in the direction of connecting with the connector, and the tool insertion port is provided closer to the connector than the wire in the direction intersecting with the connection direction.

Accordingly, by reducing the moment load applied to the connector, the wear caused by the pin breakage and the solder crack can be prevented.

Although the embodiment has been described above with reference to the accompanying drawings, the present disclosure is not limited to such an example. It is apparent to a person skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the embodiments described above may be freely combined without departing from the gist of the invention.

What is claimed is:

1. A lock mechanism that fixes connection between a first housing and a second housing in an electronic device including the first housing and the second housing, the lock mechanism comprising:

a lock portion provided in one of the first housing and the second housing; and a fixing portion provided in another of the first housing and the second housing, and configured to fix the lock portion by latching the lock portion in a direction intersecting with a connection direction of the first housing and the second housing, wherein the lock portion includes an attachment portion that attaches the lock portion to the one of the first housing and the second housing, and a lock claw portion configured to latch to the fixing portion, and when the first housing and the second housing are connected, the lock portion is moved from a first side of the fixing portion towards a second side of fixing portion in the connection direction until the lock claw portion is latched to the fixing portion such that the lock claw portion is provided at a position closer to the fixing portion than the attachment portion in the connection direction and closer to the fixing portion than the attachment portion in the direction intersecting with the connection direction, and the attachment portion is positioned on the second side of the fixing portion.

2. The lock mechanism according to claim 1, wherein the lock portion has flexibility to allow displacement of the lock claw portion in the direction intersecting with the connection direction.

3. The lock mechanism according to claim 1, wherein the attachment portion is detachably provided on the one of the first housing and the second housing.

4. The lock mechanism according to claim 1, wherein the lock portion is formed of one metal plate.

5. The lock mechanism according to claim 4, wherein the lock claw portion is formed by bending the metal plate toward the fixing portion such that a thickness direction of the metal plate is a direction intersecting with the connection direction.

6. The lock mechanism according to claim 4, wherein the lock portion further includes an insertion portion that is continuous with the attachment portion and formed by bending the metal plate on one side of the first housing and the second housing.

7. The lock mechanism according to claim 1, wherein the first housing further has a tool insertion port for inserting a tool that releases a connection between the first housing and the second housing, the tool insertion port being provided in the same direction as the fixing portion and at a position farther than the fixing portion when viewed from the attachment portion in the connection direction, and the lock portion further includes an inclined portion inclined in manner of being separated from the fixing portion in the direction intersecting with the connection direction as the inclined portion approaches the tool insertion port in the connection direction.

8. The lock mechanism according to claim 7, wherein the one of the first housing and the second housing provided with the lock portion has a recess at a position between the attachment portion and the tool insertion port in an insertion direction of the tool.

9. The lock mechanism according to claim 7, wherein an end of the lock claw portion on a tool insertion port side is provided at a position closer to the inclined portion than the attachment portion in an insertion direction of the tool.

10. The lock mechanism according to claim 7, wherein the lock portion further includes a support portion that connects the lock claw portion and the attachment portion, and an angle between the attachment portion and the inclined portion is larger than an angle between the attachment portion and the support portion.

11. The lock mechanism according to claim 7, wherein the lock portion further includes another lock claw portion such that there are a plurality of lock claw portions, and the lock claw portions are provided symmetrically with respect to a center of the tool insertion port when viewed from the connection direction.

12. The lock mechanism according to claim 1, wherein the fixing portion includes a guiding inclined surface and a guide portion that guide the lock portion to be latched.

13. The lock mechanism according to claim 7, wherein the first housing further includes a connector configured to be connected to the second housing, and a wire provided on a side opposite to the connector in a direction of connecting with the connector, and the tool insertion port is provided closer to the connector than the wire in the direction intersecting with the connection direction.

* * * * *